United States Patent
Jones et al.

(10) Patent No.: US 9,581,028 B1
(45) Date of Patent: Feb. 28, 2017

(54) SMALL TURBINE STATOR VANE WITH IMPINGEMENT COOLING INSERT

(71) Applicants: Russell B Jones, North Palm Beach, FL (US); Alex Pinera, Jupiter, FL (US)

(72) Inventors: Russell B Jones, North Palm Beach, FL (US); Alex Pinera, Jupiter, FL (US)

(73) Assignee: FLORIDA TURBINE TECHNOLOGIES, INC., Jupiter, FL (US)

( * ) Notice: Subject to any disclaimer, the term of this patent is extended or adjusted under 35 U.S.C. 154(b) by 375 days.

(21) Appl. No.: 14/291,510

(22) Filed: May 30, 2014

Related U.S. Application Data

(60) Provisional application No. 61/943,601, filed on Feb. 24, 2014.

(51) Int. Cl.
*F01D 5/18* (2006.01)
*F01D 9/06* (2006.01)
*F01D 25/12* (2006.01)

(52) U.S. Cl.
CPC ............... *F01D 5/18* (2013.01); *F01D 5/188* (2013.01); *F01D 5/189* (2013.01); *F01D 9/065* (2013.01); *F01D 25/12* (2013.01)

(58) Field of Classification Search
CPC .......... F01D 5/188; F01D 5/189; F01D 25/12; F01D 9/065
USPC .......................................................... 415/115
See application file for complete search history.

(56) References Cited

U.S. PATENT DOCUMENTS

| | | | |
|---|---|---|---|
| 3,540,810 A | 11/1970 | Kercher | |
| 3,574,481 A | 4/1971 | Pyne, Jr. et al. | |
| 3,864,058 A | 2/1975 | Womack | |
| 4,257,734 A * | 3/1981 | Guy | F01D 9/041 415/115 |
| 4,437,810 A | 3/1984 | Pearce | |
| 4,526,512 A | 7/1985 | Hook | |
| 5,511,937 A * | 4/1996 | Papageorgiou | F01D 5/189 415/115 |
| 7,497,655 B1 | 3/2009 | Liang | |
| 7,549,844 B2 | 6/2009 | Liang | |
| 8,231,329 B2 | 7/2012 | Benjamin et al. | |
| 2006/0120869 A1* | 6/2006 | Wilson | F01D 5/147 416/97 R |
| 2006/0239819 A1* | 10/2006 | Albert | B22C 9/04 416/97 R |

(Continued)

FOREIGN PATENT DOCUMENTS

DE WO 2015044008 A1 * 4/2015 ............. F01D 5/189

OTHER PUBLICATIONS

English translation of WO 2015044008 A1.*

*Primary Examiner* — John K Fristoe, Jr.
*Assistant Examiner* — Behnoush Haghighian
(74) *Attorney, Agent, or Firm* — John Ryznic

(57) ABSTRACT

An air cooled turbine stator vane form a small gas turbine engine in which the vane has an airfoil of less than one inch in spanwise height, where the airfoil is a hollow airfoil having an insert that forms a sequential impingement cooling circuit for the pressure side wall and then the suction side wall. The insert includes a plurality of cooling air supply channels connected together by ribs where pressure side impingement holes are formed in the cooling air supply channels and suction side wall impingement cooling holes are formed in the ribs.

20 Claims, 5 Drawing Sheets

(56) References Cited

U.S. PATENT DOCUMENTS

| | | | |
|---|---|---|---|
| 2011/0123351 A1* | 5/2011 | Hada | F01D 5/189 416/97 R |
| 2013/0081408 A1* | 4/2013 | Molter | F01D 5/187 60/806 |

* cited by examiner

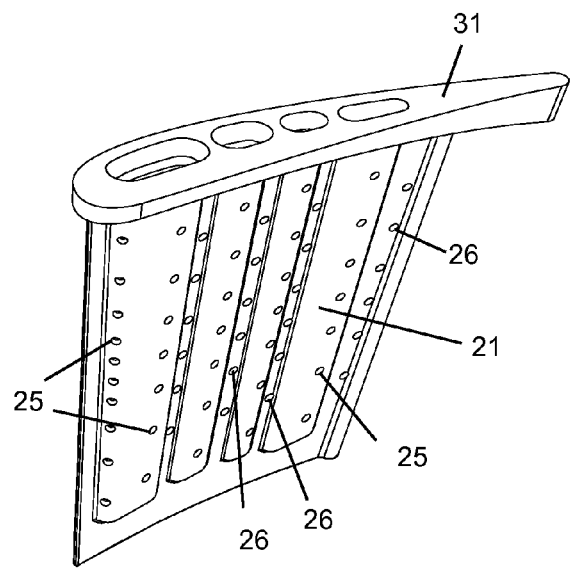
FIG 7
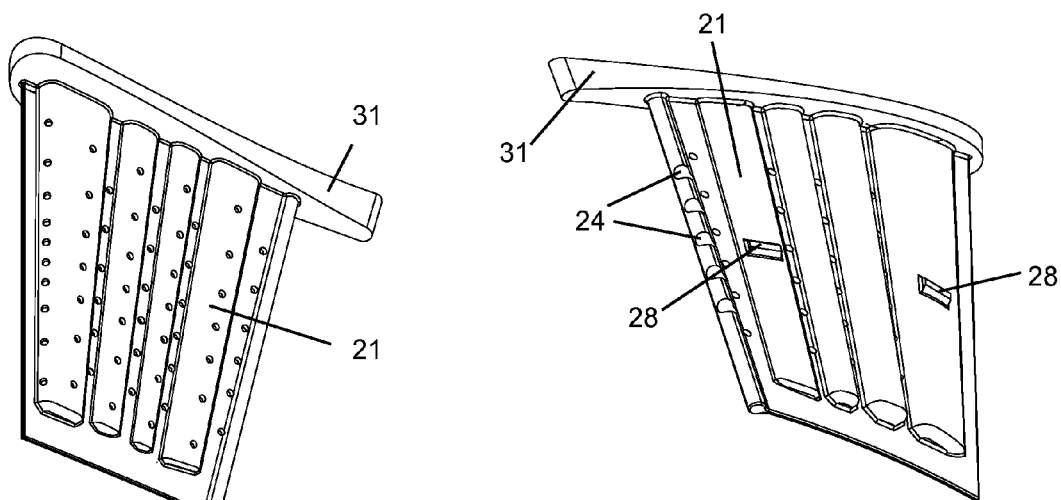
FIG 8
FIG 9

SMALL TURBINE STATOR VANE WITH IMPINGEMENT COOLING INSERT

CROSS-REFERENCE TO RELATED APPLICATIONS

This application claims the benefit to Provisional Application 61/943,601 filed on Feb. 24, 2014 and entitled SMALL TURBINE STATOR VANE WITH IMPINGEMENT COOLING INSERT.

GOVERNMENT LICENSE RIGHTS

This invention was made with Government support under contract number FA8650-13-M-2413 awarded by Department of Defense Air Force. The Government has certain rights in the invention.

BACKGROUND OF THE INVENTION

Field of the Invention

The present invention relates generally to a small gas turbine engine and more specifically to a small turbine airfoil with impingement cooling and film cooling.

Description of the Related Art Including Information Disclosed Under 37 CFR 1.97 and 1.98

Since the invention of the gas turbine engine, much technological advancement have been introduced throughout the machine to increase the power, performance, and overall efficiency of the equipment. Many of these advancements have improved the efficiency of specific components, but the most significant improvements have been realized with the development of technologies that permit the temperature and pressure of the turbine working fluid to be increased. To this end, efficient turbine cooling represents an enabling technology that has put gas turbines in the forefront of a competitive means of producing power and propulsion in the modern marketplace.

Cooling of small turbine airfoils for small gas turbine engines pose additional challenges not seen in the larger engines. The primary challenges are manufacturing of the small features such as cooling holes and wall thicknesses needed for acceptable heat transfer performance. As cooling hole size decreases, discharge coefficient (Cd) decreases nonlinearly and thus require increased pressure drop which affects overall engine efficiency. In addition, acceptable film coverage becomes very difficult because the film holes approach a size where they cannot be shaped to provide adequate film protection.

A small gas turbine engine of the size used to power a UAV is typically formed with solid stator vanes that are cast as a single piece with the rotor disk. No cooling is used because the airfoils are too small for cooling passages. Stator vanes of this small size with cooling passages cannot be cast because the airfoil walls would be too thin.

BRIEF SUMMARY OF THE INVENTION

An air cooled turbine stator vane for a small gas turbine engine of the size used to power a UAV (Unmanned Aero Vehicle), where the small stator vane is formed as a hollow airfoil with thin walls and an insert that forms a sequential impingement cooling circuit for the pressure side wall and the suction side wall. The stator vane is formed by casting a single piece rotor disk with a number of vanes extending outward, and then machined to form hollow airfoils using an EDM (Electric Discharge Machining) process to form thin airfoil walls that cannot be cast. A small turbine stator vane can thus be formed with an internal cooling circuit that cannot be formed from an investment casting process.

A thin and flexible insert is formed by a metal additive manufacturing process such as Direct Metal Laser Sintering (DLMS). The insert in conjunction with the airfoil pocket form the impingement cooling circuit. The insert includes radial tube-like channels to distribute the cooling air and impingement cooling holes as a single piece. Each insert may have a spanwise or radial length of less than one inch.

The impingement cooling insert includes a leading edge projection that engages with a slot or groove formed in the hollow airfoil to secure the insert within the airfoil cavity. The insert also includes an enlarged aft end piece that slides along the pressure and suction side walls of the hollow insert to position the insert within the hollow airfoil and to allow for thermal expansion between the hotter airfoil and the cooler insert during engine operation. In addition, these two features also act to seal the higher pressure air from the pressure-side cavity to the lower pressure air in the suction-side cavity.

The airfoil with the impingement cooling insert allows for a trailing edge of the airfoil to be as thin as 0.030 inches while still providing for film cooling air holes for both the pressure and suction side walls of the airfoil in the trailing edge region.

BRIEF DESCRIPTION OF THE SEVERAL VIEWS OF THE DRAWINGS

FIG. 7 shows a schematic upper view from a pressure side of the impingement cooling insert for the small turbine airfoil of the present invention.

FIG. 8 shows a schematic lower view from a pressure side of the impingement cooling insert for the small turbine airfoil of the present invention.

FIG. 9 shows a schematic lower view from a suction side of the impingement cooling insert for the small turbine airfoil of the present invention.

DETAILED DESCRIPTION OF THE INVENTION

The present invention is a small turbine airfoil for use in a small gas turbine engine in which the small airfoil is cooled using an insert secured within a hollow section of the airfoil. A small gas turbine engine of this size is typically used to power a UAV or Unmanned Aero Vehicle. In this small sized gas turbine engine, a stator vane stage is formed by casting a stator vane section with solid vanes and then machining each vane with a hollow section in which the airfoil walls are too thin to be cast. A machining process such as EDM can be used to form the hollow airfoils with the thin airfoil walls. The insert for use in the airfoil of the present invention is about one inch in spanwise or radial height. The airfoil is of a small size in which the radial or spanwise height of the airfoil can be one inch or less.

Figure 1:
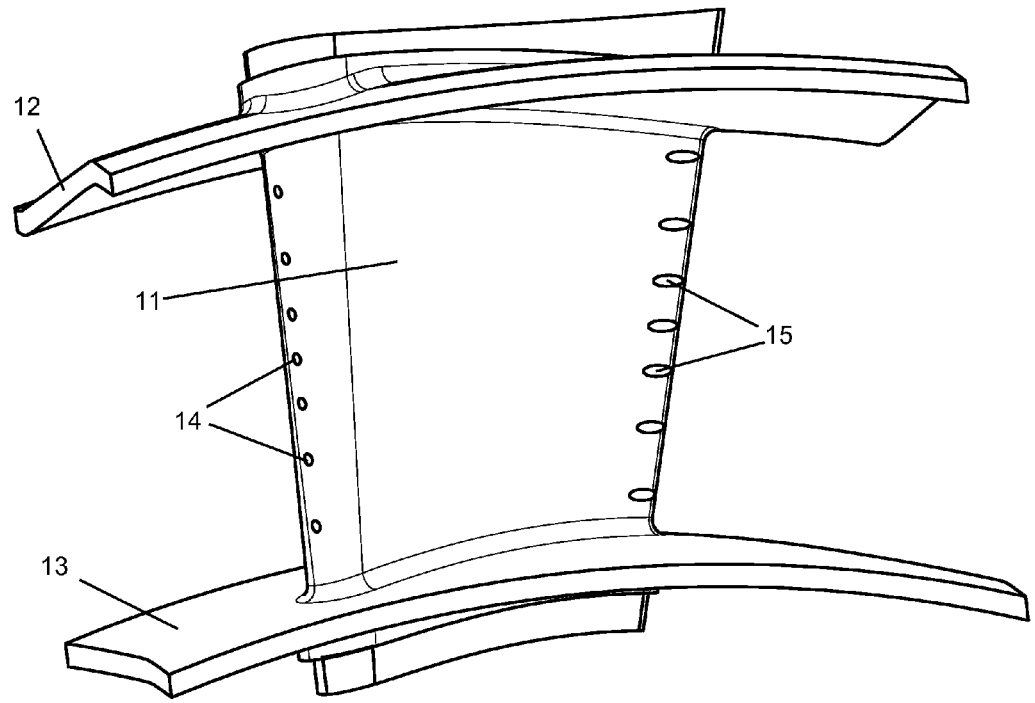
FIG. 1 shows a schematic view of the small turbine airfoil with impingement cooling insert of the present invention.

FIG. 1 shows a schematic view from a pressure side of the small turbine airfoil of the present invention with the insert secured therein. The airfoil 11 extends between an outer endwall or shroud 12 and an inner endwall or shroud 13 to form a stator vane. FIG. 1 shows a single airfoil extending between the two endwalls but could include two or more airfoils to form a multiple airfoil vane segment. The airfoil includes a row of film cooling holes 14 in the leading edge region and a row of discharge or exit slots or holes 15 in the trailing edge region.

Figure 2:
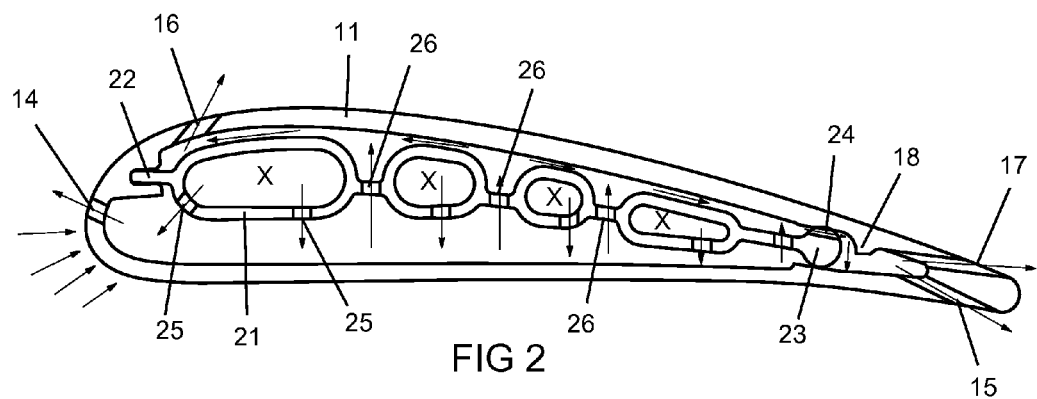
FIG. 2 shows a cross section top view of the small turbine airfoil with impingement cooling insert of the present invention.

FIG. 2 shows a cross sectional view of the small turbine airfoil from a top side with the airfoil 11 and an impingement cooling insert 21 secured within a hollow section of the airfoil 11. The insert 21 includes a forward rib 22 that fits within a slot formed in the airfoil 11 and an aft end securing piece 23 that slides along surfaces of the airfoil on the pressure side and suction side to position the insert within the hollow section of the airfoil 11 and allow for relative motion due to thermal gradients between the airfoil 11 and the insert 21.

The insert 21 also includes a number of cooling air supply channels (labeled as X in FIG. 2) to supply cooling air to rows of impingement cooling holes 25 formed within the insert 21. The insert 21 also includes rows of impingement holes 26 formed in a rib that separates the cooling air supply channels. The aft end securing piece (enlarged section) 23 also include rows of cooling channels 24 that pass cooling air to the aft section of the airfoil 11.

The insert 21 is shaped so that the impingement cooling holes 25 formed in the cooling supply channels are located a proper distance from the pressure side wall for adequate impingement cooling. The ribs connecting adjacent cooling supply channels with the impingement cooling holes 26 are also positioned so that a proper distance from the suction side wall will produce adequate impingement cooling. As seen in FIG. 2, the insert 21 is positioned closer to the suction side wall so that both film cooling holes 25 and 26 are located a proper distance from the respective wall that is being impinged on.

The airfoil 11 includes a row of film cooling holes 14 in the leading edge region to discharge cooling air from the hollow section to an external surface of the airfoil. The airfoil 11 also includes a row of film cooling holes 16 on a suction side surface downstream from a leading edge region. The airfoil includes two rows of film cooling holes 15 and 17 (staggered in the spanwise or radial direction of the airfoil 11) in the trailing edge region to discharge cooling air from the hollow section of the airfoil and cool both the pressure and suction sides of the trailing edge region. The airfoil also includes a spanwise extending projection 18 extending from the hollow section on the suction side that functions to directed the cooling air passing through the cooling channels 24 against the inner surface of the hollow airfoil wall on the pressure side for impingement cooling therein.

Cooling air is supplied to the cooling air supply channels formed within the insert 21 (labeled as X in FIG. 2) and then through the rows of impingement cooling holes 25 to produce impingement cooling of the backside surfaces of selected locations on the pressure side of the hollow airfoil 11. In the embodiment of the insert 21 disclosed in the present invention, the insert 21 includes four cooling air supply channels. Most of the cooling air that is impinged on the pressure side wall of the airfoil 11 is then directed through the impingement holes 26 formed in the insert 21 to produce impingement cooling on the suction side of the airfoil 11. Some of the impingement cooling air in the pressure side is discharged through the row of film cooling holes 14 to provide film cooling for this section of the airfoil leading edge region.

The impingement cooling air from the rows of film cooling holes 26 provides impingement cooling to the suction side wall of the airfoil, part of the flow then flows through the row of film cooling holes 16 downstream from the leading edge region. The remainder of the flow then flows through the rows of cooling channels 24 to be redirected by the projection 18 to impinge on to the pressure side wall of the airfoil 11 in the trailing edge region. After impinging on the pressure side wall, the cooling air then flows out through the two rows of film cooling holes 15 and 17 in the trailing edge region.

Figure 10:
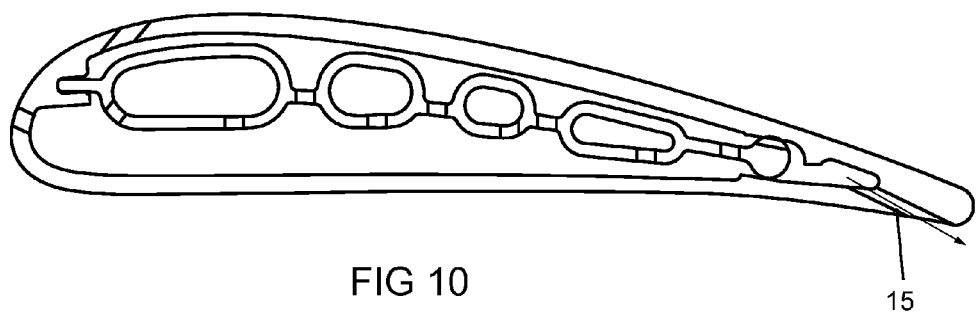
FIG. 10 shows a cross section cut through the airfoil with the pressure side film cooling hole in the trailing edge region.
Figure 11:
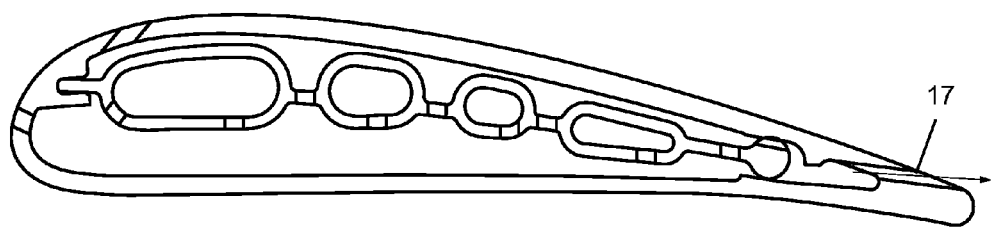
FIG. 11 shows a cross section cut through the airfoil with the suction side film cooling hole in the trailing edge region.

One of the features of the present invention that can also be used in a larger airfoil is the structure in the trailing edge region. A prior art vane includes a relatively thick trailing edge that cannot be much thinner than 0.050 inches because of the need to cool the trailing edge. The prior art vane trailing edge includes exit or discharge holes that open onto the trailing edge and provide needed cooling to the trailing edge region of the airfoil. With the present invention, a thinner trailing edge region can be produced with adequate cooling. The insert 21 includes the enlarged portion 23 that ends short of the trailing edge so that the trailing edge airfoil can be as thin as 0.030 inches. The use of the two rows of film holes 15 and 17 staggered in the radial or spanwise direction of the airfoil provides for the required cooling of the trailing edge region as well as film layers on both the pressure and suction side walls of the trailing edge of the airfoil. FIG. 10 shows the pressure side film holes 15 and FIG. 11 shows the suction side film holes 17 in the trailing edge region of the airfoil. In the prior art designs, the insert would extend into the trailing edge region and require thicker airfoil walls of no less than 0.050 inches. A prior art trailing edge would have pressure and suction side walls each of thickness 0.015 inches and an exit hole diameter of 0.020 inches for a total thickness of 0.050 inches. Thus, the insert of the present invention can be used in larger airfoils where a relatively thin trailing edge of 0.030 inches is required.

Figure 3:
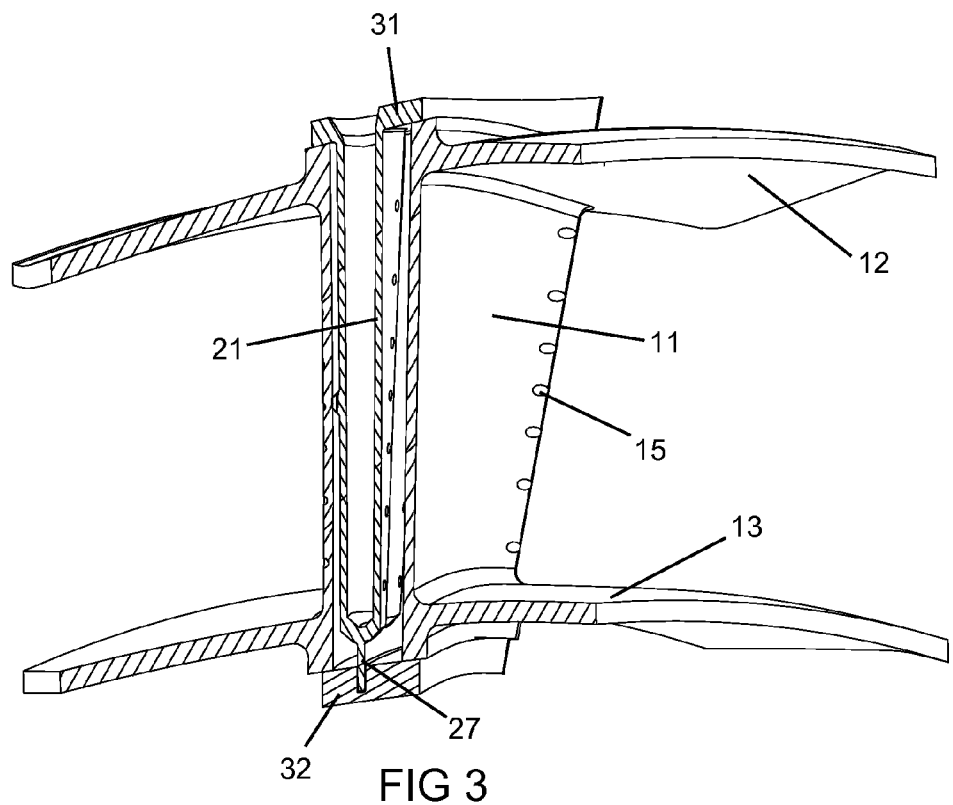
FIG. 3 shows a schematic cut-away view of the small turbine airfoil with impingement cooling insert of the present invention.

FIG. 3 shows a cut-away view of the turbine airfoil 11 with the impingement insert 21. The vane assembly includes an outer endwall end cap 31 that is secured to both the insert 21 and the outer endwall 12 of the vane. The end cap 31 is secured to both the insert 21 and the outer endwall 12 through a weld that extends around the periphery of the end cap 31. An inner end cap 32 is secured to the inner endwall 13 and encloses the inner endwall 13. The inner end cap 32 includes a slot in which a projection 27 extends from an inner end of the insert 21. The slot and the projection 27 allow for thermal growth to occur between these two members due to thermal gradients present while also maintaining a seal between the inner end cap 32 and the insert 21. The inner end cap 32 is also secured by a weld around the periphery of the end cap 32. In another embodiment (not shown), the end cap 32 may be formed integral with the endwall 13.

Figure 4:
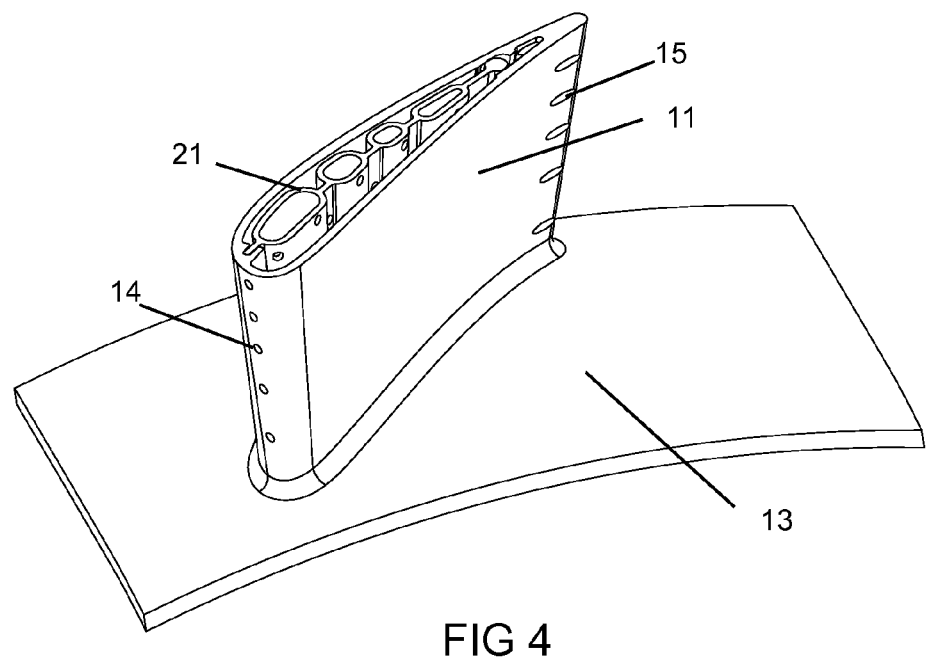
FIG. 4 shows a schematic cut-away view of the small turbine airfoil with impingement cooling insert of the present invention.

FIG. 4 shows a schematic view of a cut-away view of the insert 21 secured within the hollow section of the airfoil 11. The cooling air supply channels formed within the insert are shown.

Figure 5:
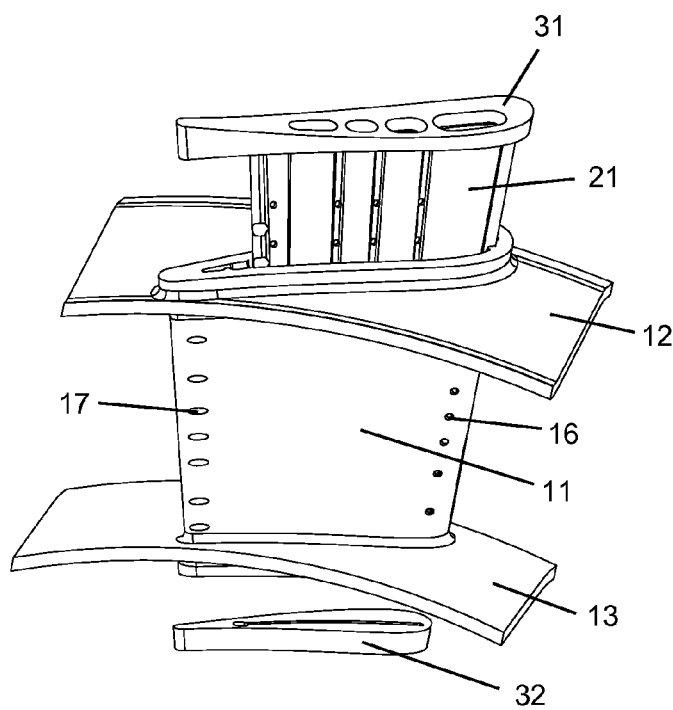
FIG. 5 shows a schematic view of the small turbine airfoil with impingement cooling insert from a suction side extending from the airfoil of the present invention.
Figure 6:
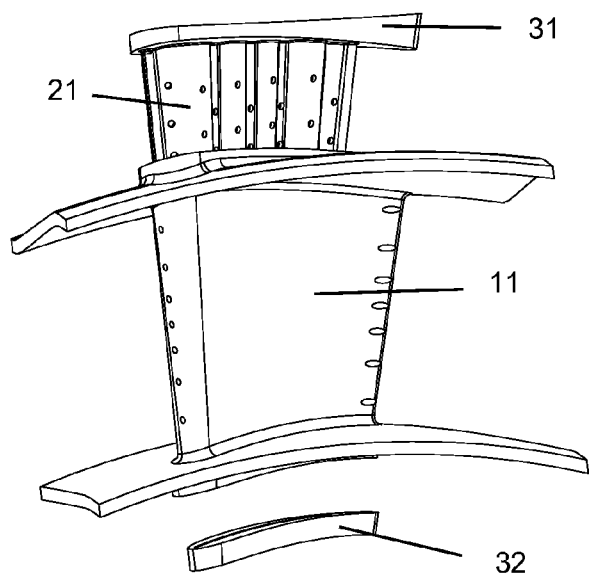
FIG. 6 shows a schematic view of the small turbine airfoil with impingement cooling insert from a pressure side extending from the airfoil of the present invention.

FIG. 5 shows the insert 21 extending out from a top side of the hollow airfoil 11 with the outer end cap 31 secured on the top end of the insert 21. The inner end cap 32 is positioned below the inner endwall 13 and is not secured to the insert 21 in this view from a pressure side. FIG. 6 shows the airfoil 11 and insert 21 of FIG. 5 from the suction side.

FIG. 7 shows the insert 21 looking from the pressure side with the outer end cap 31 secured to the top end. The cooling air supply channel openings in the outer end cap 31 are shown. The insert 21 includes rows of impingement cooling holes 25 that direct impingement cooling air to the pressure side wall and impingement cooling holes 26 that direct impingement cooling air to the suction side wall of the airfoil 21. FIG. 8 shows another pressure side view of the insert 21 from below with the outer end cap 31 secured over the top end of the insert 21. FIG. 9 shows the insert 21 from the suction side with the end cap 31 secured to the top end. Positioning abutments 28 extend from the suction side of the insert 21 and are used to position the insert against the hollow walls of the airfoil 11. The enlarged portion of the insert 21 is shown with the row of cooling channels 24.

The insert 21 is for use in a small turbine airfoil of a small gas turbine engine in which the insert would have a spanwise or radial height of around one inch. At this small size, the insert would be formed using a metal printing process in which the entire insert with cooling holes would be formed from the printing process. The insert provides cooling air to the airfoil through an impingement cooling process in which the pressure side wall is cooled first with impingement cooling followed by impingement cooling of the suction side wall using the same cooling air (in a series flow). Some of the cooling air is discharged as film cooling air in the leading edge region or near to the leading edge region, while the remaining cooling air flows out through film cooling holes in the trailing edge region. This design results in a higher heat flux on the airfoil internal wall for a given coolant flow that enables a more efficient utilization of the cooling air. The same wall temperature can be achieved with 40% to 50% less cooling air than in an airfoil having straight radial cooling passages formed within a solid airfoil.

In one embodiment of the present invention, a small gas turbine engine with an engine diameter of 9 inches and a vane ring inner diameter of 3 inches was used with stator vanes having a height of around 0.7 inches. Features of engines of this small size presents additional challenges not associated with larger engines. For example, small sizes lead to small surface areas available for heat transfer. Scaled hole sizes becomes minute and therefore prone to plugging and large manufacturing variability. Leakages are also a challenge since gaps and clearances do not scale proportionally. Therefore, the design of the turbine vane with the insert of the present invention requires the use of manufacturing limitations associated with the production of the small features. Using a Direct Metal Laser Sintering (DLMS) process was able to produce the small insert with very thin walls and very small hole diameters.

The embodiment shown in the present invention uses an insert that is inserted into the vane ring and welded at the outer diameter. A separate end cap piece is then installed at the inner diameter to close off the vane cavity. The end cap piece has a groove or slot that engages the inner diameter seal or projection 27 of the insert. Seals to isolate the pressure side cavity from the suction side cavity formed within the hollow airfoil were formed integral within the insert and engage groove features on the airfoil. This design feature avoided the added complexity of separate seals in this small turbine airfoil design. When the vane assembly is complete, the insert is fixed at the outer diameter interface of the vane ring only. This allows the insert to freely slide within the stator vane and eliminates thermally induced stresses caused by differences between the cool insert and the hot airfoil. As a result, the insert can be made from a much weaker and lower cost alloy. Another feature of the present invention is that the insert has an accordion-like shape which allows for the insert to flex in a chordwise direction of the airfoil enabling the insert to conform to the airfoil with a small amount of hub-to-tip twist.

In one embodiment of the present invention, the insert was manufactured out of Nickel Alloy 625. The insert includes round holes or diamond shaped holes for the impingement cooling holes.

The most challenging regions of the airfoil for cooling were the leading edge and the trailing edge. The leading edge was cooled using the two rows of impingement cooling holes 25 in the first or forward most cooling air supply channel formed within the insert 21. The trailing edge was cooled using the additional cavity in the trailing edge region in which the two rows of film cooling holes 15 and 17 are located. The film cooling holes 15 and 17 are staggered in the spanwise or radial direction of the airfoil. The projection 18 on the suction side of the hollow airfoil allows for a double impingement of the cooling air flowing through the channels 24 formed in the insert, where the first impingement is against the projection 18 on the suction side wall of the airfoil and the second impingement is against the pressure side wall of the airfoil.

We claim the following:

1. An air cooled turbine stator vane for a gas turbine engine, the stator vane comprising:
    an airfoil extending from an endwall;
    the airfoil being a hollow airfoil with a pressure side wall and a suction side wall extending from a leading edge region;
    an impingement cooling insert secured within the hollow airfoil;
    the impingement cooling insert having a plurality of cooling air supply channels extending in a chordwise direction of the airfoil and connected together by ribs;
    each cooling air supply channel including a row of impingement cooling holes directed to discharge impingement cooling air to a backside surface of the pressure side wall; and,
    each of the ribs including a row of impingement cooling holes directed to discharge impingement cooling air to a backside surface of the suction side wall.

2. The air cooled stator vane of claim 1, and further comprising:
    the airfoil has a spanwise height of one inch or less.

3. The air cooled stator vane of claim 1, and further comprising:
    the impingement cooling insert includes a rib on a forward side that fits within a slot formed in the hollow airfoil to secure the impingement cooling insert within the hollow airfoil; and,
    the impingement cooling insert includes an enlarged section on an aft side with surfaces that can slide along the hollow airfoil in a chordwise direction.

4. The air cooled stator vane of claim 1, and further comprising:
the pressure side wall and the suction side wall have a thickness of 0.015 inches or less.

5. The air cooled stator vane of claim 1, and further comprising:
the impingement cooling holes have a diameter of 0.015 inches or less.

6. The air cooled stator vane of claim 1, and further comprising:
the impingement cooling insert includes an enlarged section on an aft side with surfaces that can slide along the hollow airfoil in a chordwise direction; and,
a row of cooling air channels formed within the enlarged section directed to discharge impingement cooling air to a projection extending from a wall of the hollow airfoil.

7. The air cooled stator vane of claim 1, and further comprising:
the hollow airfoil includes a projection extending from a suction side wall that directs impingement cooling air to a backside surface of the pressure side wall in a trailing edge region of the airfoil.

8. The air cooled stator vane of claim 1, and further comprising:
the airfoil includes a first row of film cooling holes in a leading edge region of the airfoil;
the airfoil includes a second row of film cooling holes on the suction side wall of the airfoil near to a leading edge region of the airfoil; and,
the airfoil includes a third row of film cooling holes in a trailing edge region of the airfoil.

9. The air cooled stator vane of claim 1, and further comprising:
the impingement cooling insert includes a rib on the lower section that fits within a slot formed in an inner cap to secure the insert and seal between pressure-side and suction-side cavities.

10. A method of cooling a stator vane in a small gas turbine engine in which the stator vane has an airfoil of one inch or less in spanwise direction, the method of cooling the stator vane comprising the steps of:
passing cooling air through a parallel arrangement of cooling air supply channels formed within an insert;
discharging impingement cooling air through a row of impingement cooling holes formed in each of the cooling air supply channels to impinge against a pressure side wall of the airfoil;
collecting the cooling air between the insert and the pressure side wall and passing the cooling air through rows of impingement cooling holes formed within the insert to impinge against a suction side wall of the airfoil; and,
collecting the cooling air between the insert and the suction side wall and discharging some of the cooling air through film cooling holes on the suction side wall of the airfoil near to the leading edge region of the airfoil.

11. The method of cooling a stator vane of claim 10, and further comprising the step of:
passing some of the cooling air collected between the insert and the suction side wall through a row of cooling air channels in an aft section of the insert to impinge on a projection extending from a suction side wall of the hollow airfoil.

12. The method of cooling a stator vane of claim 11, and further comprising the step of:
directing the cooling air impinging on the projection to impinge on a pressure side wall of the hollow airfoil in the trailing edge region of the hollow airfoil.

13. The method of cooling a stator vane of claim 12, and further comprising the step of:
discharging the cooling air from the row of cooling air channels in the aft section of the insert through one or two rows of film cooling holes formed in the trailing edge region of the hollow airfoil.

14. An impingement cooling insert for an air cooled turbine stator vane used in a small gas turbine engine, the impingement cooling insert comprising:
a plurality of cooling air supply channels forming a parallel flow of cooling air through the insert;
a row of impingement cooling holes in each of the cooling air supply channels on a pressure side of the insert;
a rib connecting each of the cooling air supply channels;
a row of impingement cooling holes in each of the ribs.

15. The impingement cooling insert of claim 14, and further comprising:
the insert is formed as a single piece.

16. The impingement cooling insert of claim 14, and further comprising:
the insert includes a forward rib extending from a forward side and an aft rib extending from an enlarged section on an aft side.

17. The impingement cooling insert of claim 16, and further comprising:
the enlarged section includes a row of cooling air channels connecting a forward side of the enlarged section to an aft side of the enlarged section.

18. The impingement cooling insert of claim 14, and further comprising:
the impingement cooling air holes have a diameter of 0.015 inches or less.

19. The impingement cooling insert of claim 14, and further comprising:
the insert being a single piece and is flexible due to the ribs connecting each of the cooling air supply channels together.

20. The impingement cooling insert of claim 14, and further comprising:
the insert is formed from a metal printing process.

* * * * *